J. P. WEIS.
AUTOMATIC DESIGN CUTTING MACHINE.
APPLICATION FILED JUNE 8, 1907. RENEWED JAN. 21, 1910.
966,280.
Patented Aug. 2, 1910.
12 SHEETS—SHEET 3.
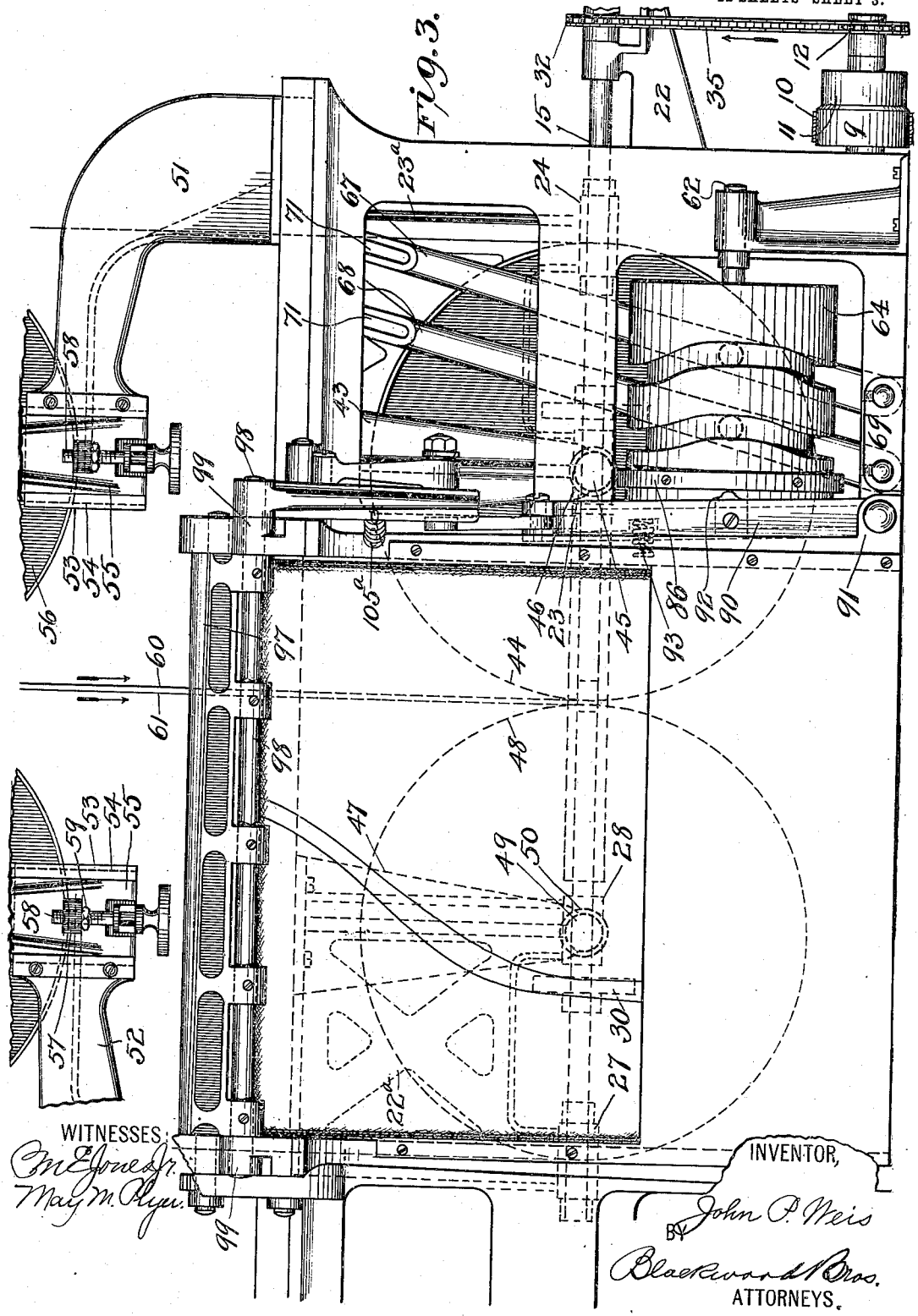
WITNESSES
INVENTOR,
John P. Weis
BY
Blackward Bros.
ATTORNEYS.

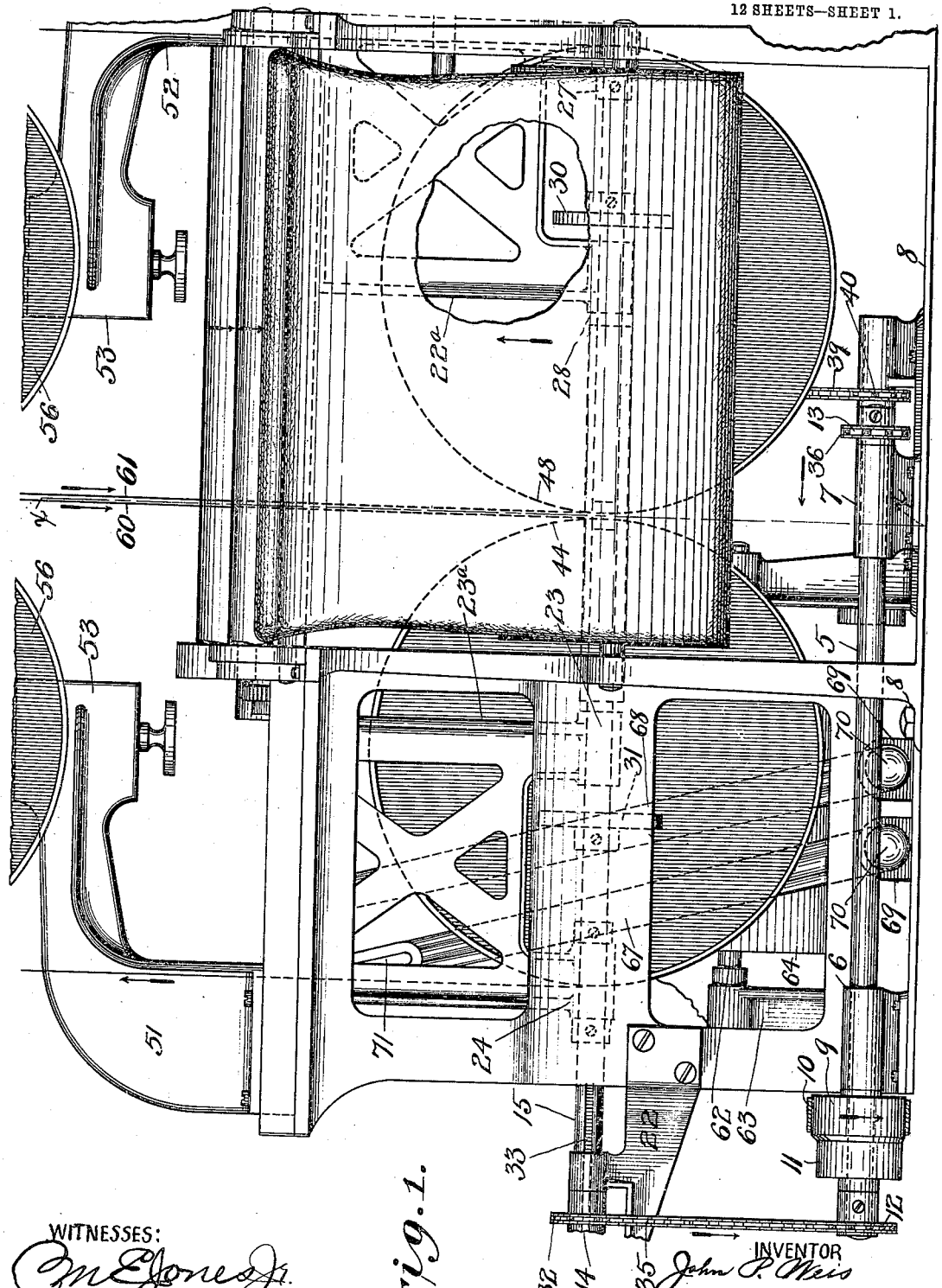

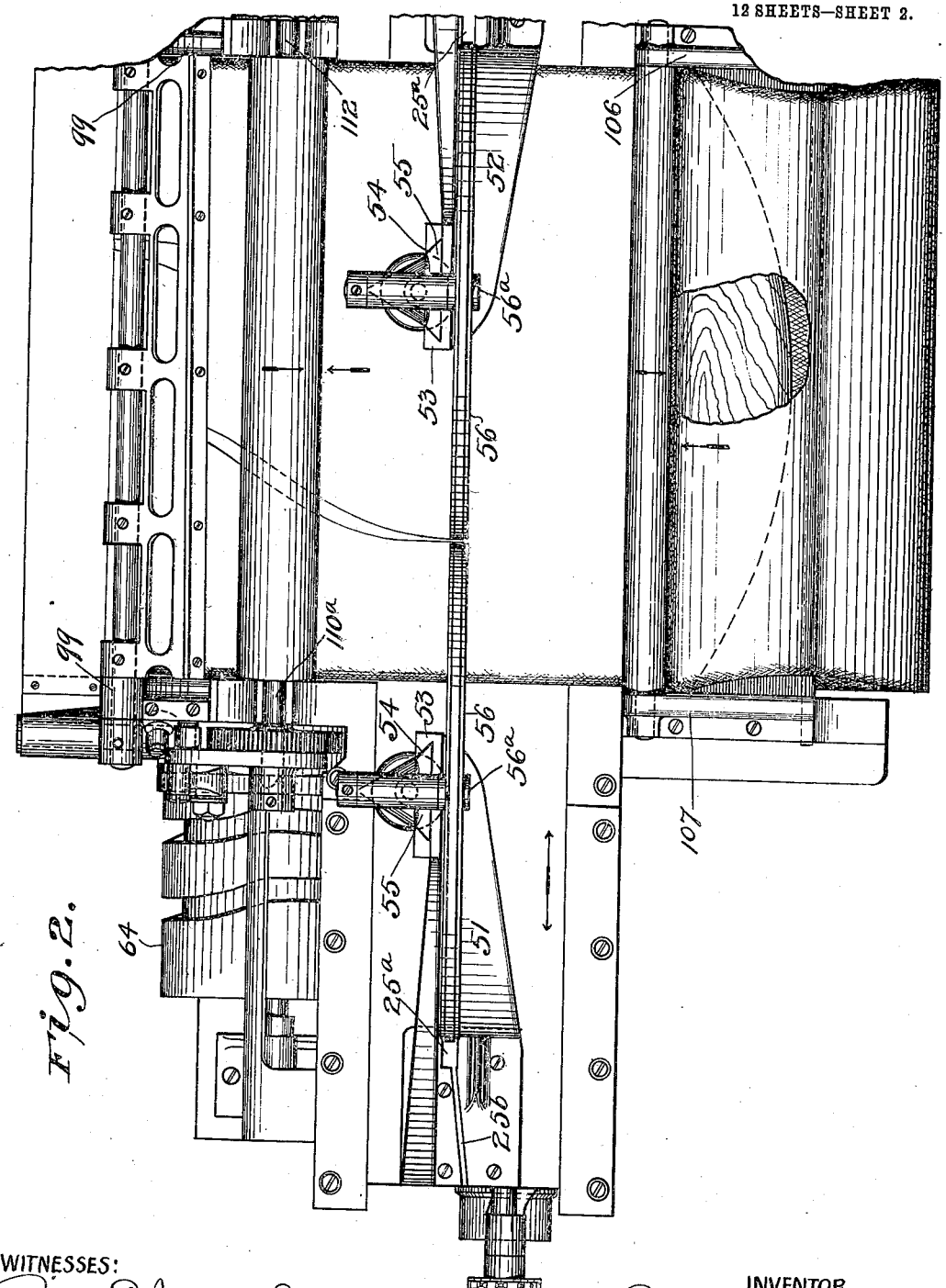

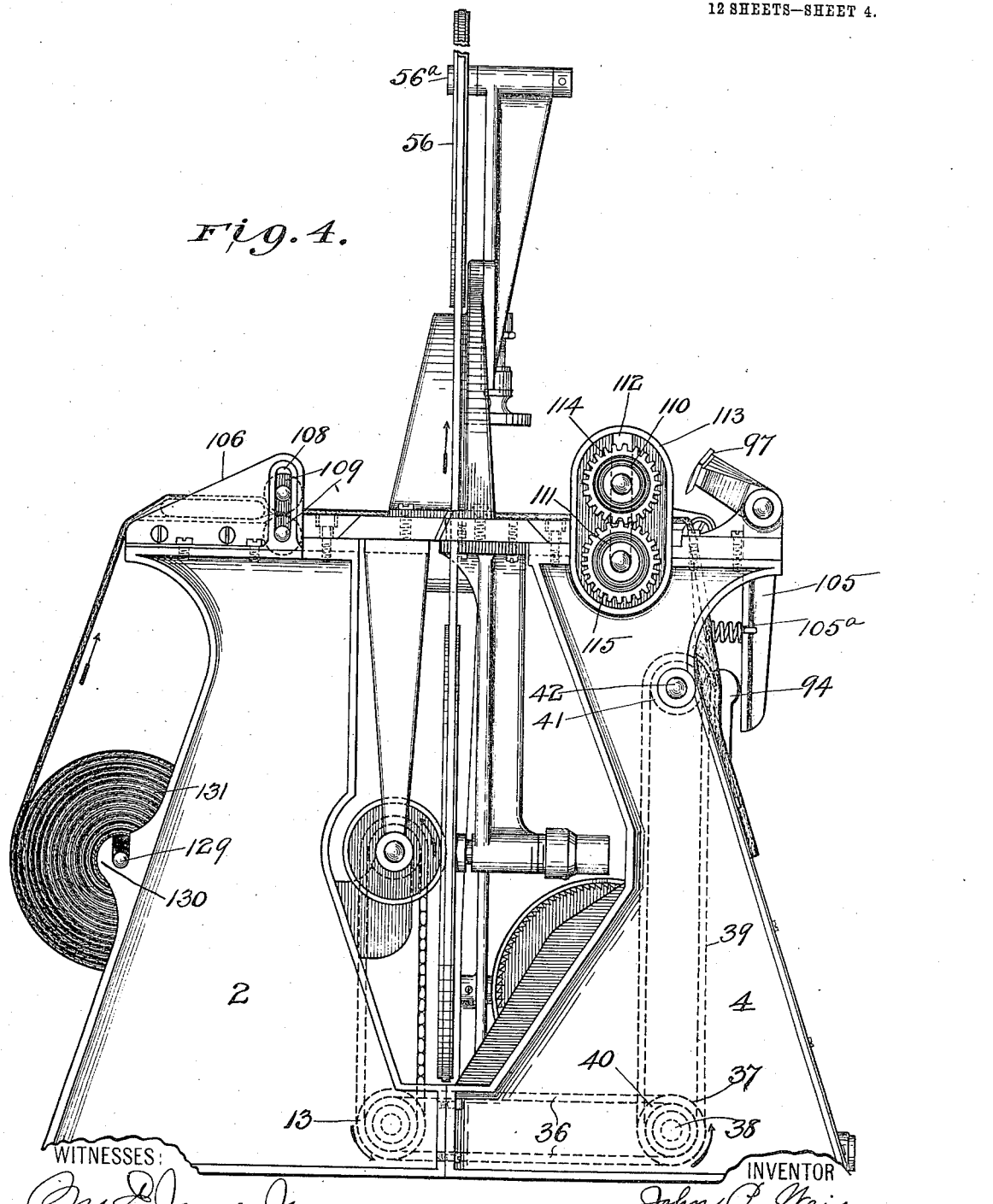

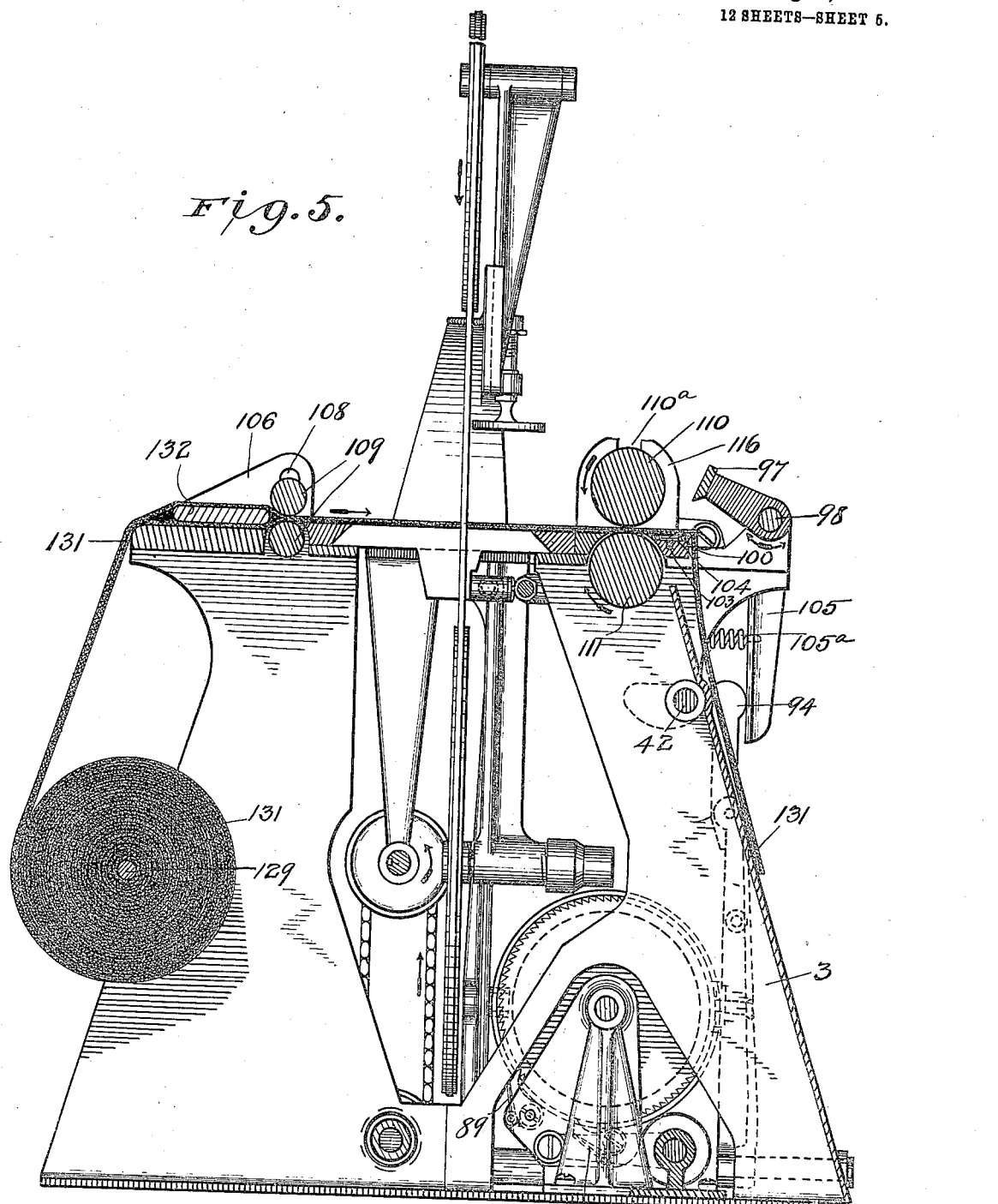

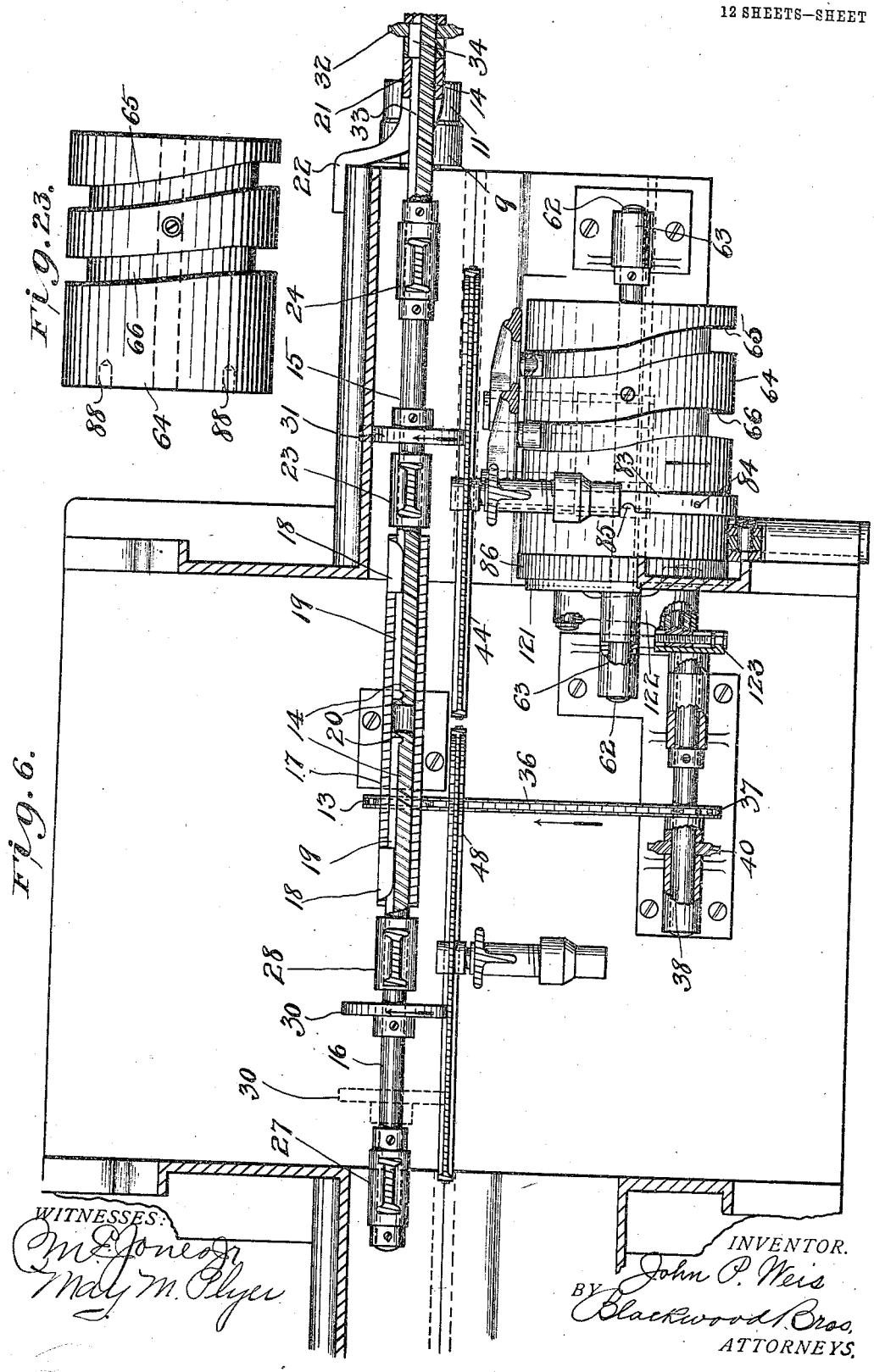

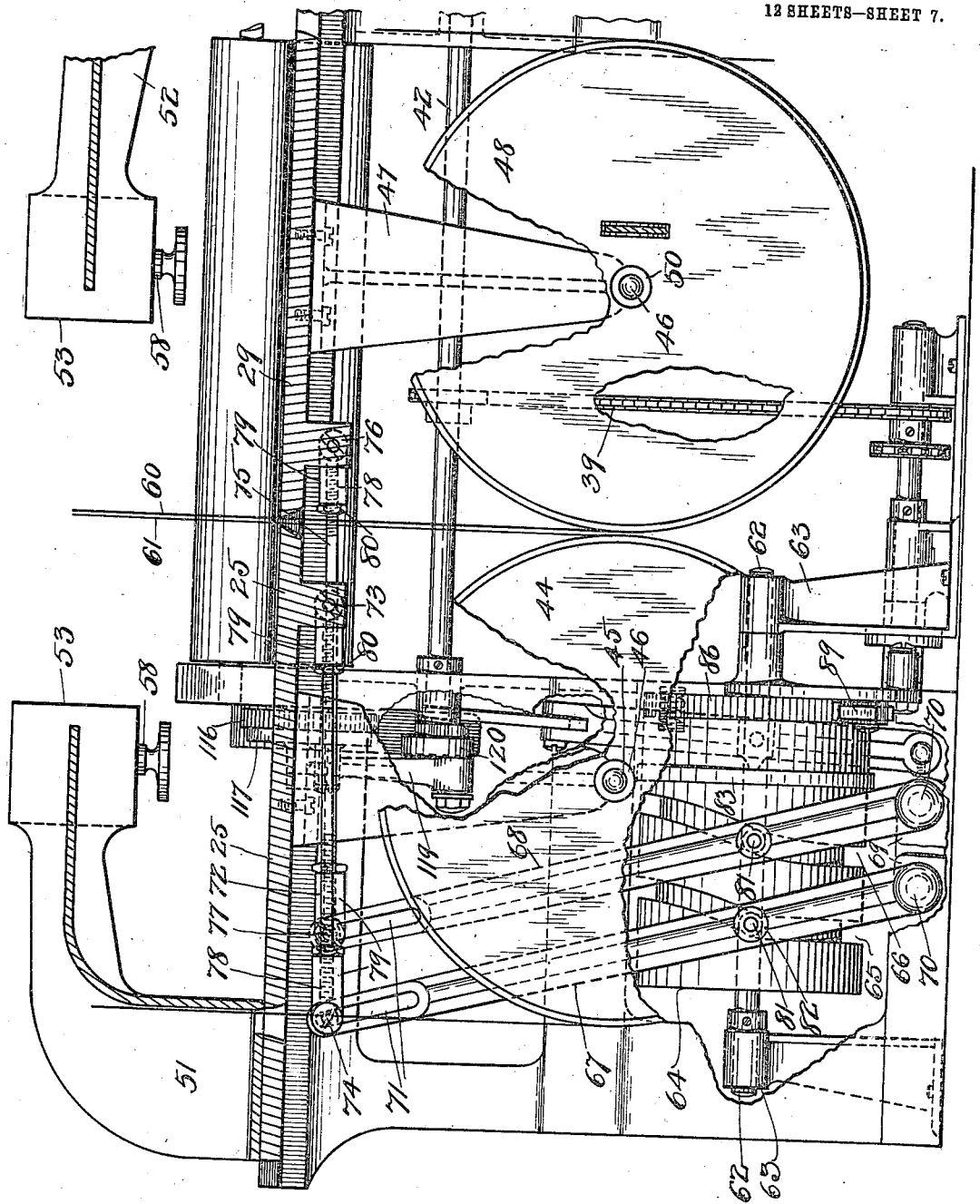

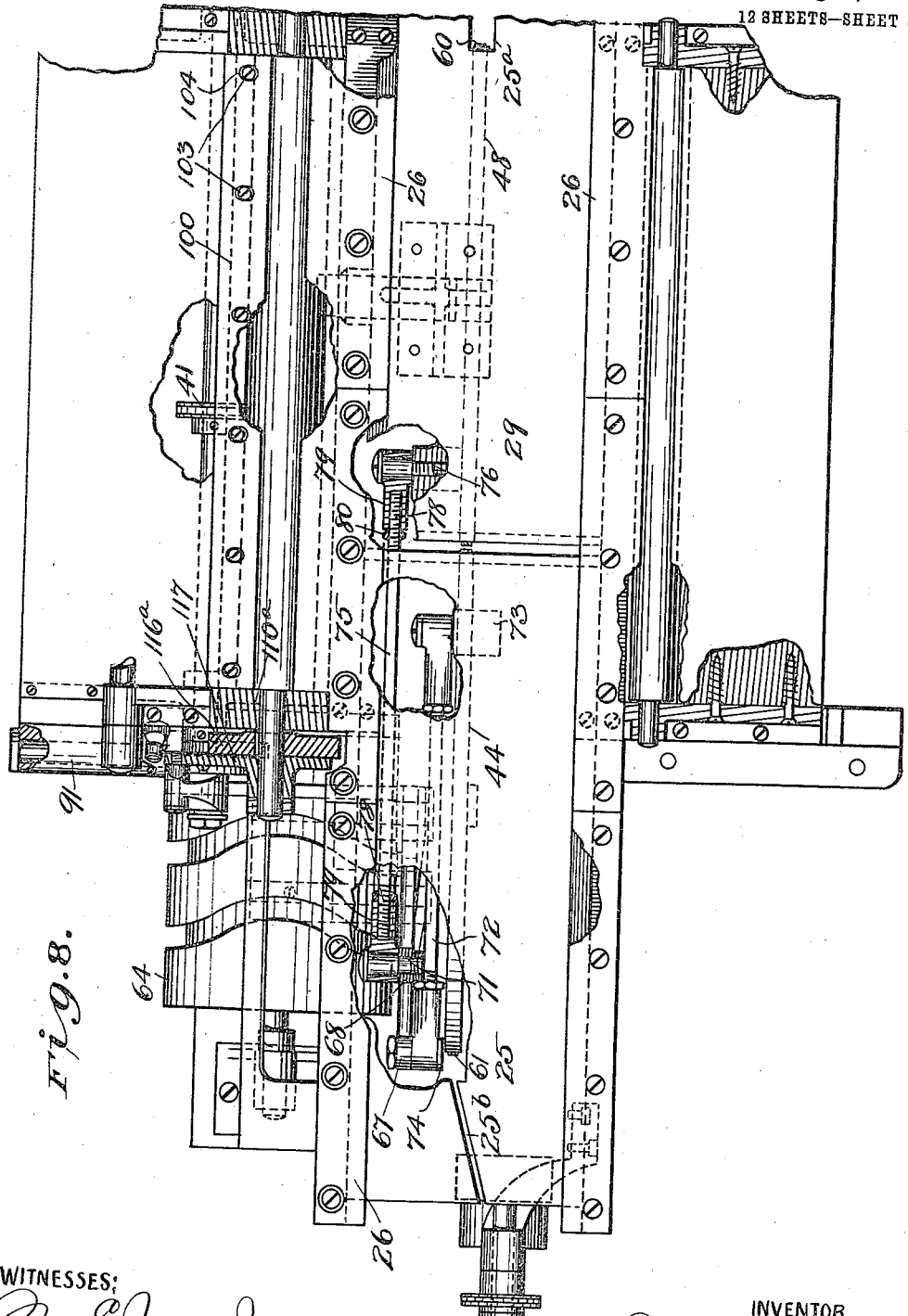

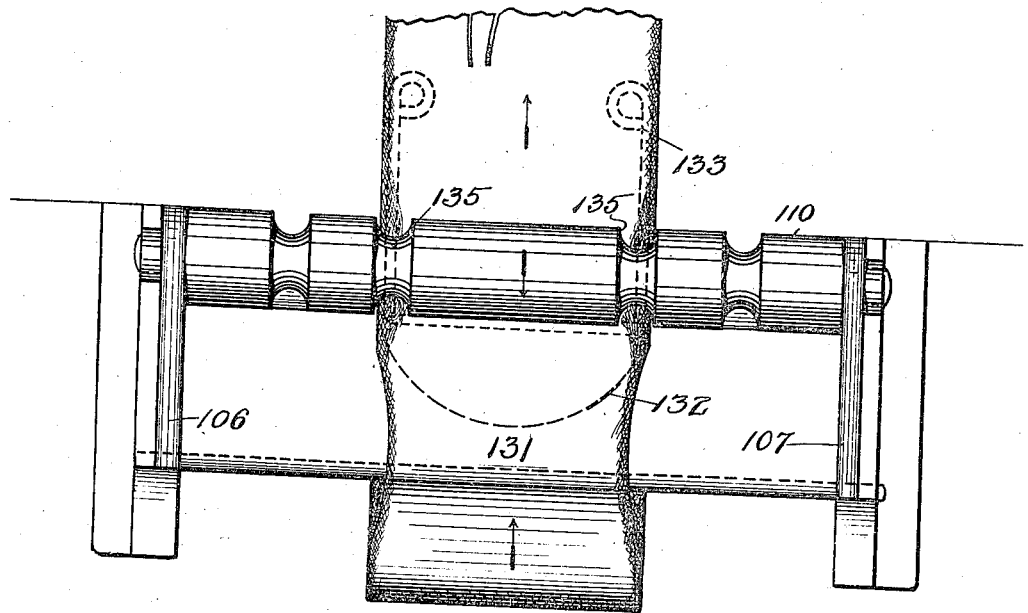
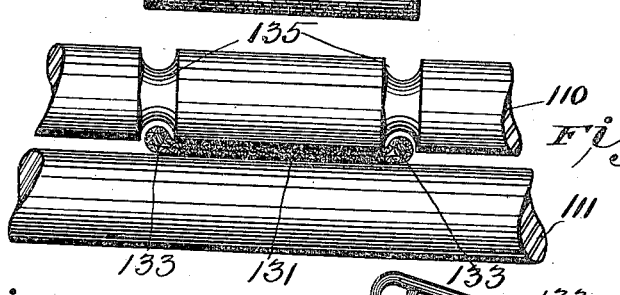
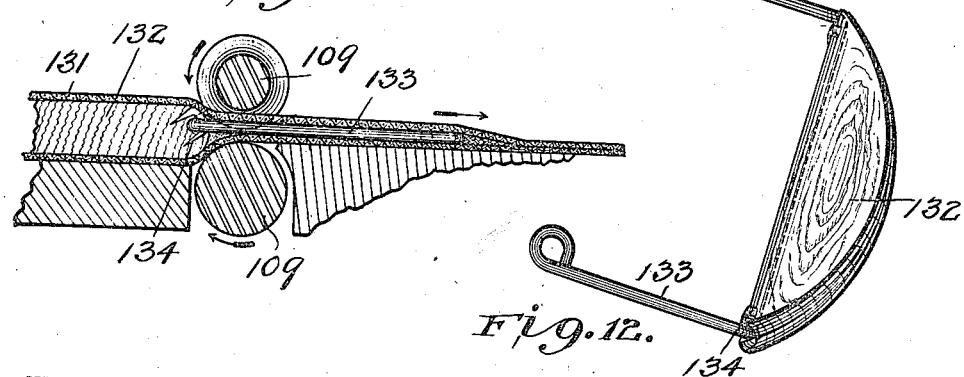

J. P. WEIS.
AUTOMATIC DESIGN CUTTING MACHINE.
APPLICATION FILED JUNE 8, 1907. RENEWED JAN. 21, 1910.
966,280.
Patented Aug. 2, 1910.
12 SHEETS—SHEET 10.
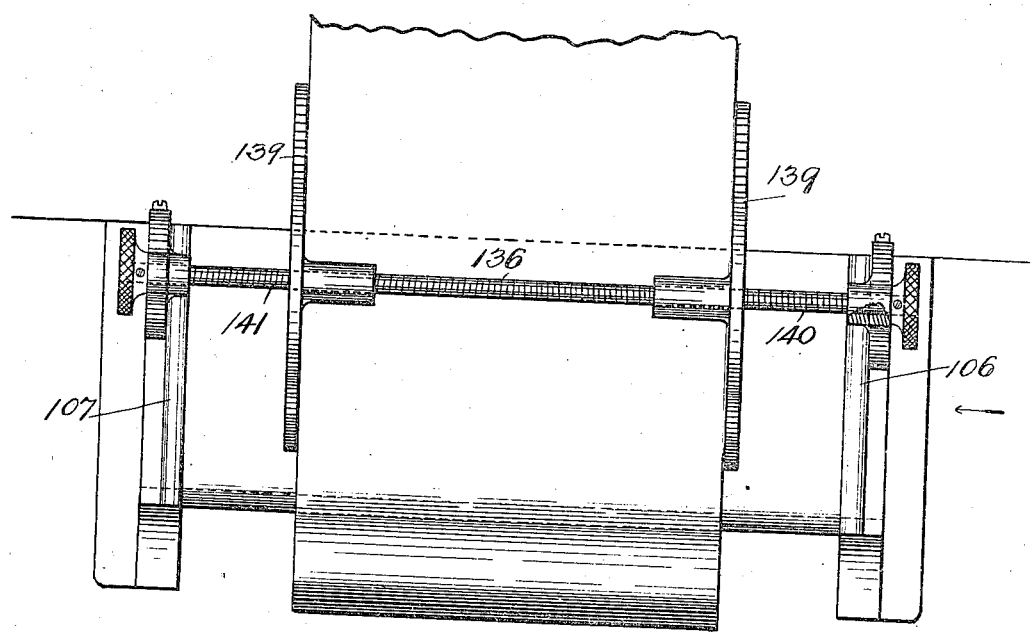
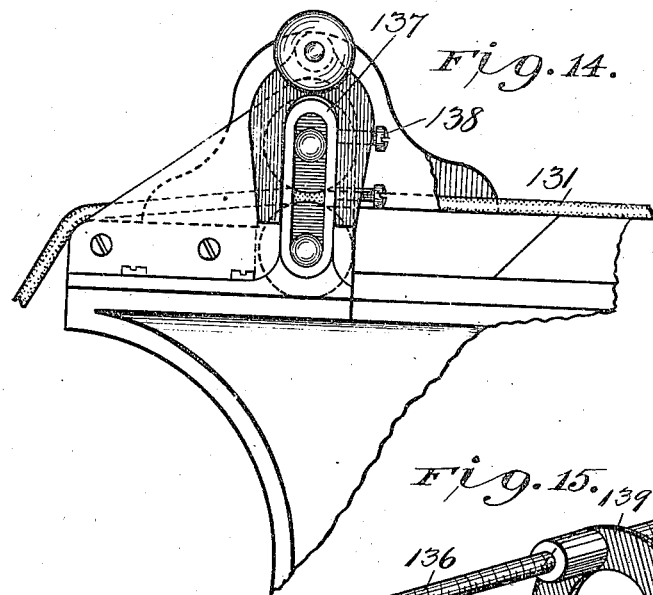
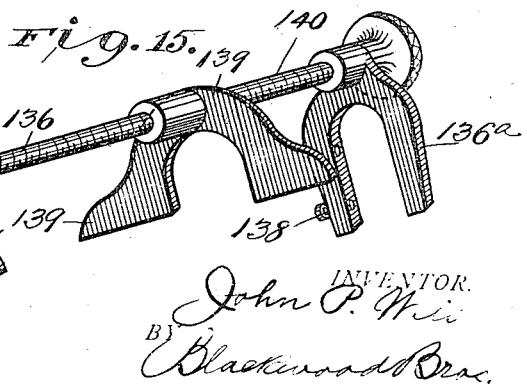
WITNESSES:
INVENTOR.
John P. Weis
BY Blackwood Bro.
ATTORNEYS.

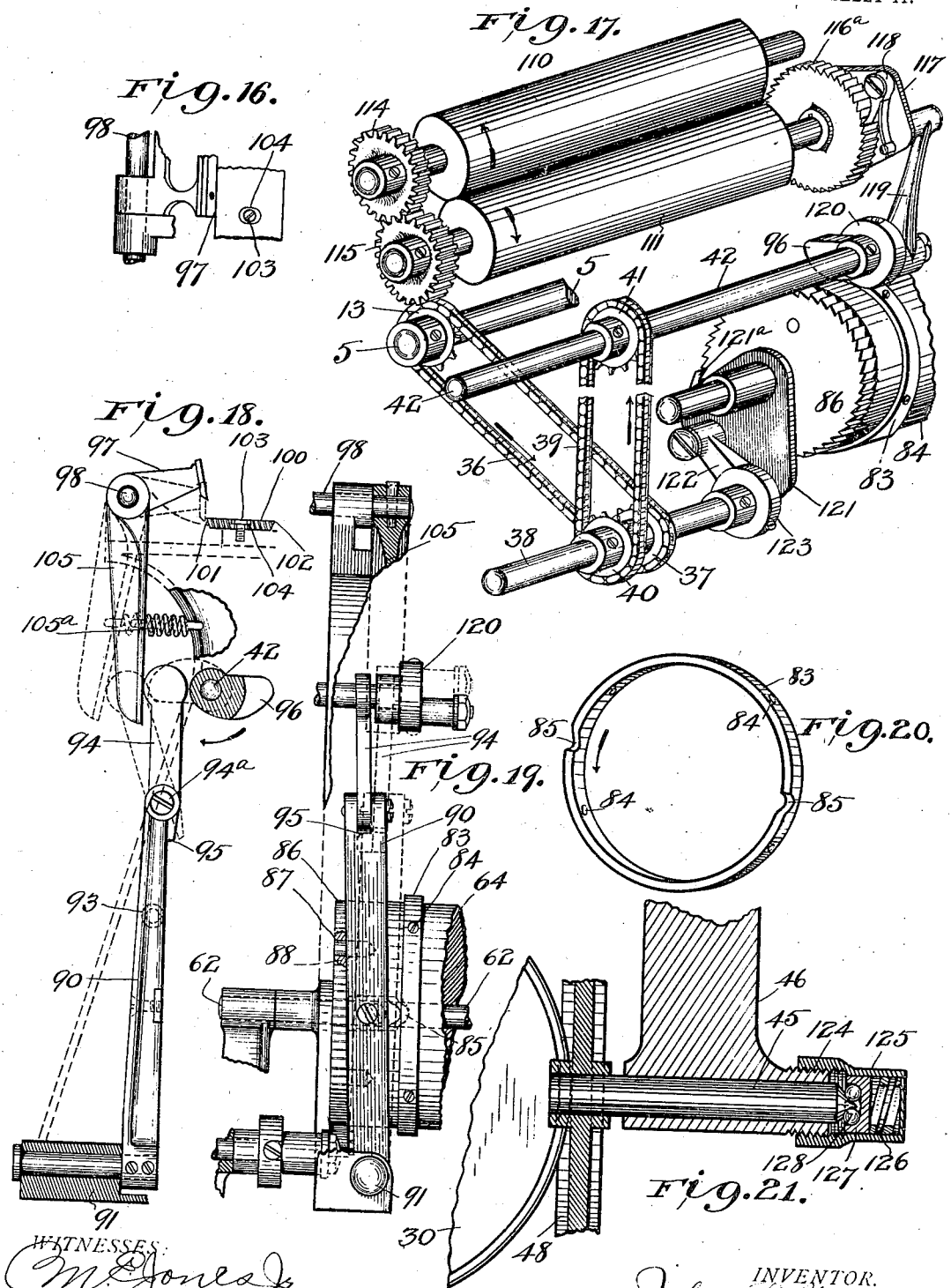

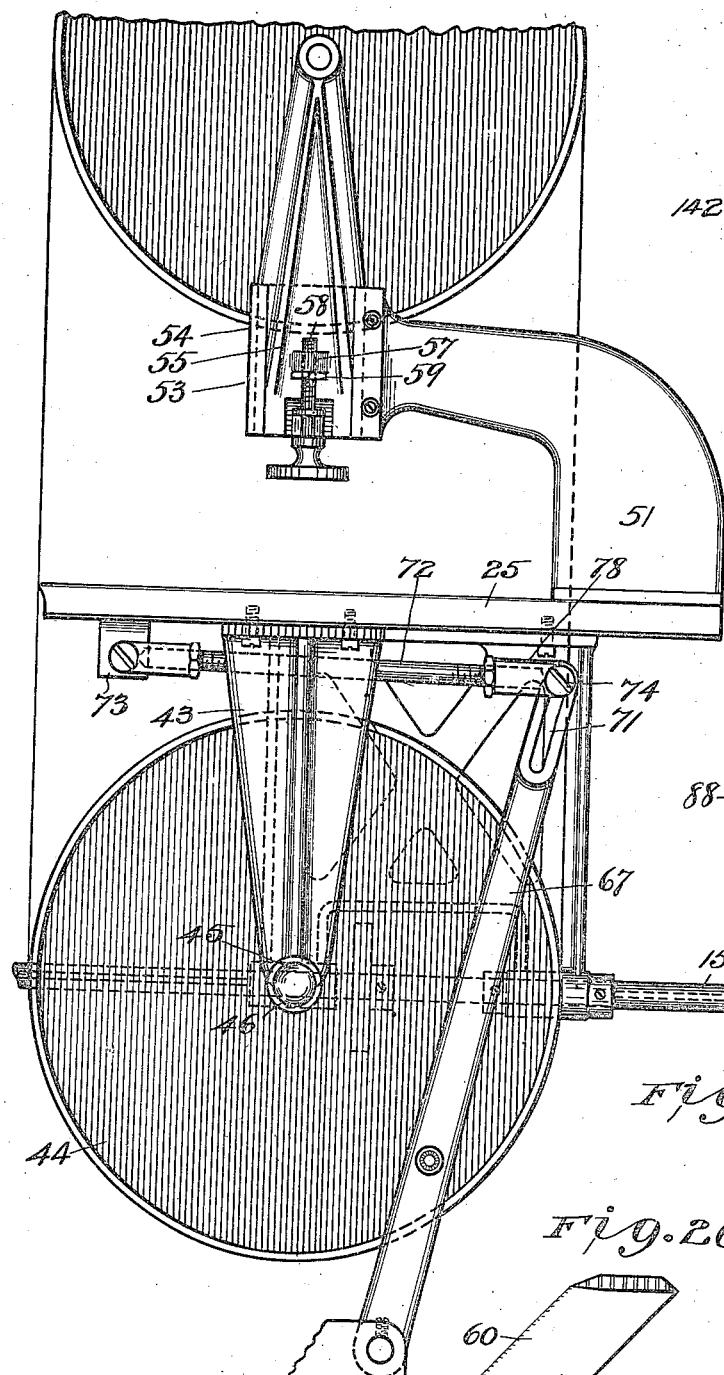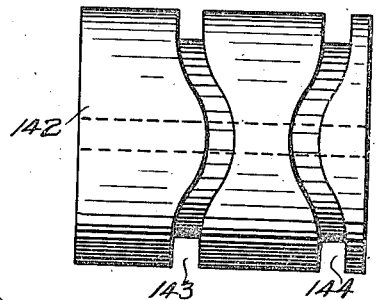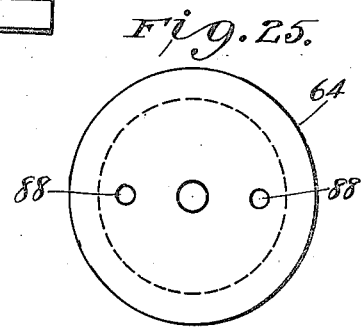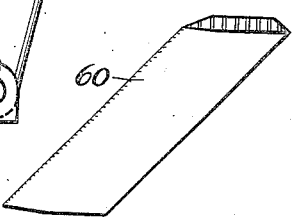

UNITED STATES PATENT OFFICE.

JOHN P. WEIS, OF NYACK, NEW YORK.

AUTOMATIC DESIGN-CUTTING MACHINE.

966,280.  Specification of Letters Patent.  Patented Aug. 2, 1910.

Application filed June 8, 1907, Serial No. 377,922. Renewed January 21, 1910. Serial No. 539,309.

*To all whom it may concern:*

Be it known that I, JOHN P. WEIS, a citizen of the United States, residing at Nyack, in the county of Rockland and State of New York, have invented new Improvements in Automatic Design - Cutting Machines, of which the following is a specification.

My invention relates to improvements in an automatic design cutting machine for cutting out designs of any desired configuration or size which will be uniform in every detail from any material with a minimum amount of waste.

It has for its object to provide a machine with means which will cut out the same pattern continuously in large quantities, while running at a high rate of speed, and in which the configuration or shape of the design can be changed as often as is desired and the length of the pieces being cut can be regulated. To provide a machine which is capable of cutting a design from a single thickness of material, or from a multiple of thicknesses or pile of material at the same time and which will cut the material on a straight line, diagonally or on a curve thus enabling the machine to cut any desired pattern. To provide a machine in which the design cutting means can be regulated to produce designs which are different in configuration and size on opposite sides of the machine. To provide a machine in which the design cutting means can be caused to operate at different speeds without changing the speed of the machine, and in which both of the cutting means may be so close together that they will cut on a single line or separated so that they will cut on different lines. To provide a machine in which the means for cutting the design and the means for cutting the material off after the design has been cut are both operated by the means that operate the pattern roll. To provide means for spreading out and removing all wrinkles, plaits or folds in the material before it reaches the cutting means. To provide a machine which is simple and durable in construction, easily operated, and by which materials of various widths can be used and cut off at any desired lengths. To provide a machine with one or more rotary cutters which are designed to reciprocate or travel from one side of the machine to the other while in operation and to provide means whereby one or more of the cutters may be thrown into or out of operation without affecting the other cutters. To provide a machine with cutting means that can be sharpened while they are in operation. To provide a machine whereby when one piece of material is used up another piece can be readily attached to the end of the preceding piece without stopping the machine.

Among the advantages of my machine are the following: The material to be cut is automatically smoothed out before it is presented to the cutters, thus avoiding being stretched out of shape or distorted and when it leaves the machine the pieces are all of uniform length, shape and size. When patterns are made from cardboard, paper, wood or other like materials they are usually traced with a pencil or marker and the pencil marks are a great detriment, especially where white or light colored material is being used as they become soiled. I do not use a marker of any description and as a consequence the material is delivered from my machine in good clean condition. It is also the case where patterns are made from cardboard, paper, wood or other like materials they retain their shape for a very short time and eventually become useless but my pattern being formed in a steel or other hard metal roll will retain its shape for a long time, almost indefinitely, and thus all variations in the pattern are avoided.

The machine will do the work of approximately six men and one man can easily operate a number of machines.

The invention consists in the construction, combination and arrangement of the several parts as more fully hereinafter described and claimed.

Referring to the drawings:—Figure 1 is a front view in elevation. Fig. 2 is a top plan view. Fig. 3 is a rear view in elevation. Fig. 4 is an elevation of the right hand end of the machine. Fig. 5 is a cross sectional view taken on the line $x$—$x$ of Fig. 1, looking in the direction of the arrow. Fig. 6 is a horizontal, longitudinal sectional view, taken on the line Y—Y of Fig. 3. Fig. 7 is a vertical sectional view partly in elevation. Fig. 8 is a top plan view with the upper wheels of band cutters removed. Fig. 9 is a detail plan view of the guide rollers and spreader frame, for use when tubular material is to be cut. Fig. 10 is a detail elevation of the guide rollers and spreader. Fig. 11 is a detail sectional view of the guide rollers and spreader. Fig. 12 is a perspective view of the spreader frame. Fig. 13 is a top plan view of a portion of the machine with the adjustable guide for use when not cutting tubular material. Fig. 14 is an end elevation of Fig. 12, looking in the direction of the arrow. Fig. 15 is a perspective view of the adjustable guide shown in Figs. 13 and 14. Fig. 16 is a top plan view of a portion of one of the cutters, for cutting off the material to the proper length after the design has been cut. Fig. 17 is a perspective view of the tension rollers, ring, pattern roll, etc. Fig. 18 is an end elevation of one of the cutters for cutting off the designs to the proper length. Fig. 19 is a rear view of Fig. 18. Fig. 20 is a perspective view of the ring which is mounted on the pattern roll. Fig. 21 is a detail sectional view of the cushioning device for the shafts of the wheels of the band cutters. Fig. 22 is a detail elevation of one of the band cutters and its operating mechanism. Fig. 23 is a detail view of the pattern roll. Fig. 24 is a detail view of a pattern roll showing a different design from that illustrated in the other figures. Fig. 25 is an end elevation of Fig. 23. Fig. 26 is a perspective view of a portion of one of the band cutters. Fig. 27 is a detail side view of a modified form of band cutter.

In the drawings like numerals of reference denote like parts through the several views.

The frame work of the machine comprises four parts, viz. Front frames 1 and 2, and rear frames 3 and 4, designed to be mounted on a suitable base, (not shown) preferably about one foot high, which may be provided with compartments having doors, said compartments affording a storage place for tools, etc.

The main driving shaft 5, of the machine is mounted in bearings 6 and 7 on the lower portion 8 of the frame thereof, and is provided with a main driving pulley 9 which is operatively connected, by means of a belt 10 with any suitable driving power, 11 being a loose pulley on which the belt is designed to be shifted when it is desired to stop the machine. Sprocket wheels 12 and 13 are rigidly mounted on the driving shaft 5.

14 is a shaft made in two sections 15 and 16, connected together by a loose sleeve 17, which is provided with keys 18, at each end, said keys sliding in grooves 19 in each of the two sections 15 and 16, and each groove 19 being provided with a stop 20 designed to rest against the keys 18 for the purpose of preventing the two sections from being slid out of the sleeve 17. The section 15 of the shaft 14 is mounted in a bearing 21 on a bracket 22 and bearings 23 and 24 on a bracket 23ª depending from a longitudinal slidable dovetail plate 25, mounted between side guide strips 26, while the section 16 of the shaft 14 is mounted in the bearings 27 and 28 on a bracket 22ª depending from a longitudinally slidable dovetail plate 29 also mounted between side guide strips 26. Friction disks 30 and 31 are rigidly secured to the sections 15 and 16 respectively of the shaft 14 and are provided with any suitable covering to produce friction. Near their outer ends each of the dovetail slidable plates 25 and 29 is provided with a rectangular hole 25ª therethrough and a slot 25ᵇ leading from the outer end of said plates to said holes 25ª. The outer end of the section 15 is provided with a sprocket wheel 32, the bore of which is made slightly larger than the circumference of said section for the purpose of permitting the section 15 to slide therein while it is rotating, and said section 15 is provided with a slot 33 having a key 34 seated therein.

Sprocket chain 35 operatively connects sprocket wheels 12 and 32, sprocket chain 36 operatively connects sprocket wheel 13 on shaft 5 with sprocket wheel 37 on shaft 38, and sprocket chain 39 operatively connects sprocket wheel 40 on shaft 38 with sprocket wheel 41 on a shaft 42. The slidable dovetail plate 25 is provided with a depending bracket 43 which has a wheel 44 mounted on a short shaft 45 which is carried in a bearing 46 at the lower end of said bracket. The slidable dovetail plate 29 is provided with a depending bracket 47 which has a wheel 48 mounted on a short shaft 49, carried in a bearing 50 at the lower end of said bracket.

Arms 51 and 52 project upwardly and inwardly from the top of the slidable dovetail plates 25 and 29 respectively, and may be secured to said plates by screws, or in any other manner, and each is provided with a head 53 having a vertically extending dovetail slot 54; and slidable brackets 55, made dovetail in shape at their lower ends are mounted in the dove-tail slots 54 of the heads of arms 51 and 52. Each of the said slidable brackets 55 has a wheel 56 at its upper end mounted on a short shaft 56ª. The lower ends of said brackets 55 are provided with interiorly screw threaded lugs 57, and screws 58, secured to the heads 53, engage the screw threads of said lugs, 59 being lock nuts on said screws 58.

An endless band cutter 60 is mounted on and travels around the wheel 44 on shaft 45 of bracket 43 and wheel 56 on the arm 51, and another endless band cutter 61 is mounted on and travels around the wheels 48 on shaft 49 of bracket 47 and wheel 56 of the arm 52. The degree of tension of the band cutter can be regulated by adjusting the slidable brackets 55, by means of the screws 58 and the brackets locked after being adjusted by means of the lock-nuts 59.

62 is a shaft supported at each end by a bracket 63, rising from base of the machine, and 64 is a pattern roll secured to said shaft and provided with two cam grooves 65 and 66.

67 and 68 are levers each pivoted at its lower end to a bracket 69 as shown at 70, the upper end of each of said levers being provided with an elongated slot 71. A rod 72 connects the upper end of the lever 67 with the slidable dovetail plate 25, said rod being pivoted at one end to a lug 73 depending from the slidable dovetail plate 25, and the opposite end is pivoted to the lever 67 by means of a screw 74 which passes through the slot 71. A rod 75 connects the upper end of the lever 68 with the slidable dovetail plate 29, said rod being pivoted at one end to a lug 76 depending from the said plate 29, and the opposite end is pivoted to the lever 68 by means of a screw 77 which passes through the slot 71. Each of the rods 72 and 75 is screw-threaded at its opposite ends as at 78 and said screw-threads engage internally screw threaded sleeves 79. The length of the rods 72 and 75 can be varied by adjusting the same in the sleeves 79 and when so adjusted can be held securely by the lock-nuts 80.

The levers 67 and 68 are each provided with a stud 81, near their lower ends, on which is loosely mounted a roller 82 which engages and travels in the cam grooves of the pattern roll. A ring 83 is secured to the pattern roll 64 by means of screws 84 and is provided on its edge with notches 85. The inner end of the pattern roll 64 is provided with a ratchet wheel 86, which is secured thereto by means of pins 87 which seat in holes 88 in the face of said pattern roll, and 89 are pawls which engage said ratchet wheel.

A lever 90 is pivoted to a lug 91 projecting from the base of the machine and is provided with a projection 92 at one side, which is kept in contact with the edge of the ring 83, by means of a spiral spring 93 which bears against said lever 90. A finger 94 is pivoted to the top of the lever 90, said finger being provided with a lug 95 at its lower end which is designed to abut against the side of lever 90 and only allows it to swing in one direction. A cam 96 is mounted on the shaft 42 and it contacts with and swings the finger 94 on its pivot 94$^a$.

For cutting the material off in the desired lengths after the band cutters have cut out the pattern a knife 97 is employed which is secured to an oscillatory shaft 98, supported at each end in brackets 99. A plate 100 having two knife edges 101 and 102 is secured by screws 103 to the frame of the machine, 104 being an elongated slot in said plate to allow for its adjustment on the screws 103. This plate in conjunction with the knife 97 severs the material into the desired lengths, and if one of the cutting edges become dull the plate can be reversed and the other edge can be employed. A depending arm 105 is secured by means of a pin to one end of the shaft 98 and is designed to contact with the finger 94 at all times when the said finger is thrown into the path of the cam 96 by the projection 92 engaging the notches 85 of the ring 83.

A spiral spring 105$^a$ is provided to return the arm 105 and knife 97 to their normal positions after they have been operated by the cam 96. One end of said spring 105$^a$ being attached to the frame of the machine and the other end attached to the arm 105. Upwardly extending guide plates 106 and 107 are provided at the receiving or feed-side of the machine to guide the material to be operated upon, each of said guide plates being provided with elongated vertical slots 108 in which are loosely mounted the ends of the two guide rollers 109.

110 and 111 are tension rollers made preferably of iron or steel of sufficient weight to pull the material from the guide rollers and keep it taut while it is being operated upon by the band knives, said rollers being loosely mounted at both ends in a vertical slot 112, in a casing 113, and provided with intermeshing gears 114 and 115. The opposite end of the roller 110 is mounted in an elongated slot 110$^a$ in a bracket 116 on the frame 4 while the opposite end of the roller 111 is mounted in the upper portion of the part 3 of the frame of the machine. On the end of the roller 111 opposite the end that has the gear 115, is mounted a ratchet wheel 116$^a$ and next to said ratchet wheel 116$^a$, is mounted a swinging plate 117 provided with a spring controlled ratchet pawl 118 which engages with the ratchet teeth of the wheel 116$^a$. Connected to the swinging plate 117 is a pitman 119, which is connected at its lower end to a crank pin on a disk 120 mounted on the shaft 42.

Adjacent the ratchet wheel 86 on the shaft 62 is mounted a swinging plate 21, having two spring controlled ratchet pawls 121$^a$, engaging the teeth of said ratchet wheel, and a pitman 122 operatively connects said plate with a crank pin on a disk 123 on the shaft 38. The brackets 43 and 47 depending from the slidable dovetail plates 25 and 29 respectively each having rearwardly extended screw-threaded portions 124 on which is screwed a cap 125 having a spiral spring 126 therein, and in front of the said spring a ball cup 127 containing a series of balls 128 and the end of the short shafts 45 and 49 carrying the wheels 44 and 48 abut against said balls which in connection with the springs 126 furnish a cushion for the same.

At the front of the machine a rod 129 is supported in suitable brackets 130 and on said rod is placed the roll of material 131 from which it is desired to cut the designs. As shown in Figs. 4, 5, 9, 10, 11 and 12 the material is in the form of tubular fabric and for the purpose of retarding the feed of the said fabric and spreading and smoothing it out, I employ a spreader which is inserted between the folds of the tubular fabric and which comprises a block 132, made preferably of polished wood, a wire frame 133 which is pivoted to said block 132 by means of staples 134, said wire frame designed to be placed between the rollers 109 and in grooves 135 of the upper roller.

In Figs. 13, 14 and 15, I have shown a modied form of guide for guiding the materials of different widths and of a single thickness to the machine and which comprises a screw rod 136 with thumb nuts, and having inverted U-shaped plates 136ª at each end which are designed to fit over the lateral projections 137 and be fastened thereon by means of screws 138, and adjustable guide plates 139, mounted on screw-threaded rod 136. When narrow fabric is to be used either of the thumb nuts are turned, and by reason of the screw rod having right and left hand screw threads 140 and 141 respectively when either of the thumb nuts are turned in one direction the guide plates 139 will be caused to approach each other, and when turned in the opposite direction said plates will be caused to be moved away from each other.

In Fig. 24 a modified form of the pattern roll is shown in which 142 indicates the roll and 143 and 144 the cam grooves, and in Fig. 27 a modified form of band cutter is shown, in which 145 indicates the band cutter and 146 saw teeth thereon, which are used instead of the tapering cutting edge shown in Fig. 26. The speed of the band cutters is regulated by adjusting the friction disks 30 and 31 to different points on their shafts 15 and 16 respectively so as to contact with the wheels 44 and 48 of the said band cutters at different points from the center to the edge of said wheels, the nearer the center of the said wheels the disks are located the faster the band cutters will travel on said wheels and the nearer the outer edge of the wheels the disks are located the slower said cutters will travel. A number of pattern rolls of various designs may be kept in stock and where it is desired to change any design, being used on the machine, all that is necessary to do, is to substitute a pattern roll with a different design which can be done very quickly and easily. The ring 83 can be adjusted on the surface of the pattern roll 64 so as to present the notches 85 to the projection 92 of the lever 90 at any point thereon at the proper time and every time the projection 92 engages one of the notches 85 it will cause the finger 94 to be thrown into the path of the cam 96, see dotted lines Fig. 19, and said cam to swing said finger and cause it to contact at all times with and operate the depending arm 105 which in turn operates the knife 97. The length of the pieces of material delivered by the machine depends on the number of notches 85 on the ring 83; that is to say, if the ring has only one notch the knife will be caused to operate and cut the material once in each revolution of the ring, while if the said ring has two notches the knife will be caused to operate and cut the material twice during each revolution of the ring. I have shown two notches on the ring 83 in the drawings but the number may be increased or diminished as desired.

The wheel 44 and the wheel 56 above it, or the wheel 48 and wheel 56 above it may be of such diameter that when the widest material is placed on the machine they will be equal in diameter to the width of the material and when the cutting mechanism is in such a position that one edge of the material is in contact with the arm 51, the band cutter 60 will be outside of the other edge of the material, thus rendering it possible to cut the material diagonally from edge to edge.

If both of the rods 72 and 75 are connected to the levers 67 and 68 respectively at the extreme upper end of the slots 71, both of the band cutters will produce the same design, but if on the other hand, one of said rods be adjusted to the lower end of one of the slots 71, the design would be smaller, without affecting the length or width of the same, that is to say, the curves would be less in size because the multiple of the levers becomes less and the lines cut by the band cutters would be straighter, thus it will be seen that different designs may be produced on the same machine from the same piece of material. Now if it be desired to change the width of the design of the article being cut narrower material is used, but it sometimes is desirable to produce articles of two sizes and this is accomplished by shortening or lengthening either one of the rods 72 and 75. If the rod 72 be lengthened it will cause the entire mechanism connected therewith to move nearer the center of the material which would produce a wider design on the article being cut, and if the rod 75 be shortened it will cause the entire mechanism connected therewith to move nearer the edge of the material thus the design on the article produced on that side of the machine would be narrower than the article produced on the opposite side. It will thus be seen that by the adjustment of said rods 72 and 75 a great number of variations in the width of the various designs being cut can be made from the same width of material.

The length of any design may be regulated by changing the length of stroke of the crank pin on the disk 120, which will cause the pitman 119 to give greater movement to the swinging plate 117 and the ratchet pawl 118, which in turn causes the tension rollers 110 and 111 to pull more or less material between them at each revolution, which will change the length of the design of the article without affecting the shape or contour of the same.

If the speed of the pattern roll 84 and its operating mechanism, including the disk 123 and pitman 122, swinging plate 121, etc., be such that the pawls connected to the swing plate 121 take a number of teeth at each revolution of the disk 123 and the speed of the rollers 110 and 111 be slowest at each complete revolution of the pattern roll 84, and the ring 83, which has two notches, there will be produced four articles of the same design and length.

It should be understood that if the designs be very short, so that by changing the speed of the rollers 110 and 111 or the speed of the pattern roll 84 the design could not be produced by said change, then the grooves in the pattern roll will represent six or eight lengths of a design and a corresponding number of notches 85, in the ring 83, and that number of articles per each revolution of the pattern will be produced. The levers 67 and 68 are multiples two and one-half to one and the grooves in the pattern roll 84 are reductions equal to the above for the purpose of keeping the pattern roll of the same diameter, no matter what the length of the designs formed in the grooves therein may be. If the ratchet wheel 86 has two hundred teeth and the ratchet wheel 116 one hundred teeth and the movements of the pawls 118, and 121ª be such that they take from one to six teeth at each revolution of the said ratchet wheels it will be seen that an unlimited number of lengths may be produced. If it is desirable to cut a roll of material into designated lengths such as for sleeves or legs of a garment and the width of the material be just the width of the two sleeves or legs and the design of such shape that the small end of one sleeve or leg will fit the large end of another sleeve or leg, that is to say, the dividing lines being substantially the same the band cutters will cut along said lines and avoid any waste of material.

The operation of the machine is as follows:—A roll of material 131 with a rod 129 inserted through its center is placed in the brackets 130, the spreader inserted in the tubular material with its wire frame inserted between the guide rollers 109 and the material stretched across the machine and against the band cutters and its end inserted far enough between the tension rollers to give them a purchase on the same, the machine is then started and the material is drawn against the band cutters by the rollers 110 and 111 and the design or designs are cut out by said cutters. The machine continues to run automatically and when one roll of material is nearly exhausted the end of another roll is attached to the same without stoping the machine, and so on until the desired quantity of articles have been produced.

I do not desire to be understood as limiting myself to the specific details of construction and arrangement as herein described and illustrated, as it is manifest that variations and modifications can be made in the features of construction and arrangement in the adaptation of the device to the various conditions of use without departing from the spirit of my invention and improvements. I therefore reserve the right to all such variations and modifications as properly fall within the scope of my invention and the terms of the following claims.

What I claim is:—

1. In an automatic design cutting machine, cutting means which rotate and reciprocate toward and from each other, substantially as described.

2. In an automatic design cutting machine, cutting means and means for independently reciprocating said cutting means during the operation of cutting, substantially as described.

3. In an automatic design cutting machine, design cutting means, oscillatory length cutting means, and means for causing said design cutting means to move toward or from each other across the path of the oscillatory length cutting means, substantially as described.

4. In an automatic design cutting machine, rotary band cutters mounted on arms carried by slidable plates and means for reciprocating said plates, substantially as described.

5. In an automatic design cutting machine, rotary cutters mounted on wheels supported by arms secured to slidable plates, and means for reciprocating said plates independently of each other during the operation of cutting, substantially as described.

6. In an automatic design cutting machine, slidable plates carrying wheels, band cutters mounted on said wheels and means for reciprocating said plates while the work is passing over the same and operating said band cutters, substantially as described.

7. In an automatic design cutting machine, slidable plates carrying wheels, band cutters mounted on said wheels, a pattern roll, means for operatively connecting said slidable plates and pattern roll and means for operating said pattern roll, substantially as described.

8. In an automatic design cutting machine, slidable plates having arms carrying wheels, means for reciprocating said plates, band cutters mounted on said wheels, and means for adjusting said wheels to regulate the tension on said band cutters and a pattern operatively connected with said slidable plates, substantially as described.

9. In an automatic design cutting machine, slidable plates carrying wheels, band cutters mounted on said wheels, a pattern roll, levers operatively connecting said pattern roll and slidable plates, and means for operating said pattern roll, substantially as described.

10. In an automatic design cutting machine, means for cutting the design from the body of the material and means for cutting the material off after the design has been cut both operated by the same means, substantially as described.

11. In an automatic design cutting machine, means for cutting the design, means for cutting the material off after the design has been cut, a pattern roll, means for operating the design cutting means, and means for cutting off the material and operating the pattern roll, substantially as described.

12. In an automatic design cutting machine, band cutters, a knife for cutting the material into lengths and a pattern all operated by the same means, substantially as described.

13. In an automatic design cutting machine, wheels band cutters mounted thereon, and means for moving said wheels and band cutters toward and from each other without interrupting the feed of the material, substantially as described.

14. In an automatic design cutting machine, wheels having band cutters arranged in alinement, said band cutters being at an angle to the face of the said wheels and means for moving said cutters toward and from each other, substantially as described.

15. In an automatic design cutting machine, band cutters, and means for causing both of said cutters to cut on the same line while reciprocating across the machine, substantially as described.

16. In an automatic design cutting machine, band cutters and means for causing said cutters to cut on different lines while they are rotating and reciprocating and the material is being fed to the machine, substantially as described.

17. In an automatic design cutting machine, band cutters mounted on slidable plates, a pattern roll, levers operated by said pattern roll and adjustable means connecting said levers and slidable plates, substantially as described.

18. In an automatic design cutting machine, band cutters mounted on slidable plates, a pattern roll, levers operated by said pattern roll and adjustable rods connecting said levers and slidable plates, substantially as described.

19. In an automatic design cutting machine, band cutters mounted on slidable plates, a pattern roll having grooves, levers operated by said pattern roll and having rollers engaging the grooves in said pattern roll, and means for connecting said levers and slidable plates, substantially as described.

20. In an automatic design cutting machine, four cutters, and means for operating one of said cutters independently of the others, and a pattern for controlling the direction of the cut of said cutters, substantially as described.

21. In an automatic design cutting machine having band cutters mounted on wheels supported on slidable plates, means for reciprocating any one of said band cutters independently of the others, substantially as described.

22. In an automatic design cutting machine having band cutters, means for reciprocating and rotating one of said cutters simultaneously with the operation of the other cutter, substantially as described.

23. In an automatic design cutting machine having rotary band cutters, means for causing said band cutters to reciprocate while they are rotating, a pattern for controlling the direction of the cut of said band cutters, and means for operating said pattern, substantially as described.

24. In an automatic design cutting machine, having a rotary pattern, band cutters, means for operatively connecting said band cutters and pattern, a knife for cutting off material in lengths and means for operatively connecting said knife and pattern, substantially as described.

25. In an automatic design cutting machine, a pattern, band cutters, means for operatively connecting said band cutters and pattern, a knife for cutting off material in lengths, gravity rolls for gripping the material, means for operatively connecting said knife and rolls with the pattern, and means for operating same pattern, substantially as described.

26. In an automatic design cutting machine, design cutters, a pattern roll having cam grooves and a trip ring secured thereto, means for operating the pattern roll and means operatively connecting said pattern roll and design cutters, substantially as described.

27. In an automatic design cutting machine, a pattern roll having grooves, levers provided with rollers engaging said grooves, a ratchet wheel and trip ring secured to said pattern roll, cutters mounted on slidable plates and means for operatively connecting said levers and slidable plates, substantially 28. In an automatic design cutting machine, means for changing the length of the design without affecting its width or the feed of the material, substantially as described.

29. In an automatic design cutting machine, means for changing the width of the design without affecting its length or the shape of the pattern, substantially as described.

30. In an automatic design cutting machine, band cutters and means for causing said band cutters to travel at different speeds without changing the speed of the main driving mechanism of the machine, substantially as described.

31. In an automatic design cutting machine, endless band cutters mounted on adjustable wheels carried by slidable plates, a pattern roll, levers connected to said plates by means of adjustable rods and connected to and operated by said pattern roll, substantially as described.

32. In an automatic design cutting machine, means for regulating the length independently of the feeding mechanism and design cutting, substantially as described.

33. In an automatic design cutting machine, adjustable guides projecting beyond the front and rear of the guide rollers designed to be adjusted laterally to suit the width of the material being cut, substantially as described.

34. In an automatic design cutting machine, means for guiding the material to the machine, comprising a screwthreaded rod having a depending plate at each end and depending guide plates between said end plates, substantially as described.

35. In an automatic design cutting machine, means for spreading and smoothing out the material before it enters the machine to be cut, comprising a block, and a wire frame pivoted to said block, designed to be placed between the guide rollers, substantially as described.

36. In an automatic design cutting machine, means for spreading and smoothing out the material before it is cut, comprising a block and a frame pivoted to said block, designed to be placed between the guide rollers, substantially as described.

37. In an automatic design cutting machine, means for spreading out the material before it is cut comprising guide rollers, one of which is provided with grooves, a frame designed to be inserted between the layers of said material and both frame and the material thereon inserted between the guide rollers and seated in the slots of one of the guide rollers, substantially as described.

38. In an automatic design cutting machine, a pivoted knife for cutting the material into lengths, provided with an arm, a pattern roll provided with a ring having notches, a lever provided with a projection to engage said notches and a pivoted finger and means for causing said pivoted finger to engage the arm of the knife and operate said knife, substantially as described.

39. In an automatic design cutting machine, a knife for cutting the material into lengths, a pattern roll provided with notches, a lever provided with means for engaging said notches, and a pivoted finger designed to operate the knife and a cam for operating said finger, substantially as described.

40. In an automatic design cutting machine, a knife, a plate having cutting edges which in connection with the knife cuts the material into suitable lengths, means for operating said knife and rotatable cutters at an angle to said knife, substantially as described.

41. In an automatic design cutting machine, band knives wheels around which said band knives travel, having shafts mounted in brackets, said brackets each having extended screw-threaded portions on which is secured a cap, said cap provided with a resilient ball bearing against which the end of said shafts abut comprising a spring and a slidable ball cup having a series of balls, substantially as described.

42. In an automatic design cutting machine, slidable plates each having arms which overhang them, said arms being provided with wheels, band cutters on said wheels, each of said plates provided with a shaft mounted in brackets depending therefrom, adjustable means for coupling said shafts together and means operatively connecting said shafts with the drive shaft of the machine, substantially as described.

43. In an automatic design cutting machine slidable plates each provided with wheels, band cutters on said wheels, each of said plates provided with a shaft mounted in brackets depending from said plates, a coupling device for the shafts in which they are adjustable and means for operatively connecting said shafts with the drive shaft, substantially as described.

44. In an automatic design cutting machine, slidable plates carrying wheels with band cutters thereon, each of said plates provided with a shaft mounted in brackets depending therefrom, friction disks each mounted on one of the sections of a two part shaft and contacting with the wheels of the band cutters, and means for operating said band cutters and disks, substantially as described.

45. In an automatic design cutting machine, slidable dovetail plates, mounted between guides and carrying wheels having band cutters thereon, a pattern roll having grooves, levers having rollers engaging said grooves and slotted at their upper ends, rods one end of each pivoted to one of the said slidable plates and the other end pivoted and adjustable in the slots of the levers, substantially as described.

46. In an automatic design cutting machine, slidable plates provided with wheels mounted on arms projecting upward from said plates, wheels mounted on brackets depending from said plates, band cutters mounted on said wheels, means for operating said plates and means for reciprocating said wheels and band cutters, substantially as described.

47. In an automatic design cutting machine, slidable plates having holes with slots leading therefrom, rotary band cutters mounted on wheels and passing through said holes, the edges of said band cutters provided with saw teeth, substantially as described.

48. In an automatic design cutting machine, guide rollers mounted loosely in slots in brackets on each side of the machine and gravity tension rollers also mounted in slots formed in a bracket on one side of the machine and a casing on the opposite side thereof, substantially as described.

49. In an automatic design cutting machine a plurality of cutters, means for operating said cutters and means for intermittently operating one of said cutters independently of the others without interfering with the operation of the machine, substantially as described.

50. In an automatic design cutting machine, band cutters mounted on wheels supported on slidable plates, said wheels extending from the top and bottom of said plates, a pattern, levers operated by said pattern and means for connecting said levers and slidable plates, substantially as described.

51. In an automatic design cutting machine, means for guiding the material to the machine comprising a rod having plates at each end and adjustable guide plates mounted on said rod, substantially as described.

52. In an automatic design cutting machine one or more rotatable cutting devices each mounted on a reciprocatory slide, said cutting devices operatable in a path extending across the machine, substantially as described.

53. In an automatic design cutting machine, one or more cutting devices slidably mounted in a path extending from one end of the machine to the other and a path for the material to traverse and be forced between to the length cutting members, substantially as described.

54. In an automatic design cutting machine, comprising one or more cutters, means for actuating said cutters, means for supporting said cutters, slides which operate in a path from end to end of the machine, and a path for the material extending from end to end of the machine and crossing the path of the slidable cutter path said material passing over said slides while they are moving, substantially as described.

55. In an automatic design cutting machine, rotatable and oscillatory cutters, means for controlling the feed of the material in its passage over the machine and while it is being cut, substantially as described.

56. In an automatic design cutting machine, slidable plates carrying wheels rotary band cutters mounted on said wheels, means for reciprocating said slidable plates toward and from each other, a pattern roll having grooves in its circumference, levers operatively connected to said slidable plates and having rollers engaging the grooves in said pattern roll, and means for operating the slides, cutters, levers and pattern roll simultaneously, substantially as described.

57. In an automatic design cutting machine, one or more cutting devices, means for actuating and supporting the same, said supporting means for the cutting devices supporting the material while being cut, substantially as described.

58. In an automatic design cutting machine, band cutters mounted to travel on wheels supported on brackets secured to the top and bottom of slides, length cutting mechanism, and means for measuring off the lengths cut, substantially as described.

59. In an automatic design cutting machine, comprising cutting means, means for changing the speed of either of the cutters without changing the main driving speed, substantially as described.

60. In an automatic design cutting machine, reciprocatory, rotatable and oscillatory cutters and means for causing the material to travel past said cutters and means for measuring off the lengths cut, substantially as described.

61. In an automatic design cutting machine, reciprocatory, rotatable and oscillatory cutters, said rotatable cutters mounted on slides, and means for causing material to travel over said slides while said slides are moving, substantially as described.

62. In an automatic design cutting machine, means for feeding the material from the supply to the spreading means and from the design cutters to the length cutters, and means for momentarily arresting the feed of said material while it is being cut, substantially as described.

63. In an automatic design cutting machine, cutters, means for driving the cutters, tension rollers, means for driving the tension rollers, a pattern roll and means for driving the same, means for guiding the material and means for guiding the cutters, substantially as described.

64. In an automatic design cutting machine, one or more cutting devices, means for imparting motion thereto, a pattern roll, means carried by said pattern roll for tripping the mechanism which actuates the end cutting device, substantially as described.

65. In an automatic design cutting machine, rotatable cutters each mounted on a slide, means for operating said cutters and slides and means for causing the material to travel over said slides while they are moving, substantially as described.

66. In an automatic design cutting machine, band cutters, means for cutting the material into lengths and a pattern all operated by the same means, substantially as described.

67. In an automatic design cutting machine, means for cutting the material into lengths and a pattern roll both operated by the same means, means for operatively connecting the length cutting means with the pattern roll and means for tripping the mechanism which actuates the length cutting means, substantially as described.

68. In an automatic design cutting machine, having a number of cutters, a pattern roll, means for intermittently operating said roll and means whereby the speed of the roll may be varied or changed independently of the speed of the machine, grip rollers that operate on the material to pull the same against the cutters, and means for changing the speed of said grip rollers independently of the speed of the pattern roll, substantially as described.

69. In an automatic design cutting machine, guide rolls which operate on the material as the same enters the machine, grip rolls which operate on the material as it is leaving the machine, design cutters which move toward and from each other while they are operating and means for causing said cutters to cut the material while it is moving across the machine and is being held taut between the guide and grip rolls, substantially as described.

70. In an automatic design cutting machine, design cutters, means for feeding and keeping the material taut while being operated upon by the said cutters, comprising guide rollers mounted loosely on said machine and gravity tension rollers also mounted thereon and means for operating said gravity tension rollers, said design cutters mounted on plates which reciprocate under the material while it is moving across the machine, substantially as described.

71. In an automatic design cutting machine, cutters, means for causing said cutters to reciprocate toward and from each other while they are rotating, a pattern roll for controlling the direction of the cut of said cutters and means for operating said cutters and pattern roll, substantially as described.

72. In an automatic design cutting machine, a pattern, cutters, means for operatively connecting said cutters and pattern, means for cutting off the material into lengths, gravity rolls for gripping the material, means for operatively connecting said length cutting means and rolls with the pattern, and means for operating said pattern, substantially as described.

73. In an automatic design cutting machine, design cutters, means for imparting motion thereto, a length cutting device, a pattern, means carried by said pattern for tripping the mechanism which actuates the length cutting device, substantially as described.

74. In a design cutting machine, design cutters each mounted on a slidable plate, means for operating said design cutters, a length cutting device, a pattern roll having two patterns, levers having means for engaging said patterns, a rod connecting each of said slidable plates with one of said levers, and means for operating said pattern roll and slides simultaneously, substantially as described.

75. In a design cutting machine, slidable plates carrying wheels, band cutters mounted on said wheels, a pattern roll, levers operatively connecting said pattern roll and slidable plates and means for adjusting said levers in relation to said slidable plates so that each band cutter will cut a design of different size, substantially as described.

76. In a design cutting machine, slidable plates carrying wheels, band cutters mounted on said wheels, a pattern roll, levers having slots and operatively connecting said pattern roll and slidable plates by means of rods which are provided with screws adjustable in said slots to different positions to cause the same design or a different design to be cut by each band cutter simultaneously, substantially as described.

77. In a design cutting machine, means for guiding the material to the machine, comprising a screwthreaded rod having an inverted U-shaped plate at each end and adjustable guide plates, substantially as described.

In testimony whereof I have signed my name to this specification in the presence of two subscribing witnesses.

JOHN P. WEIS.

Witnesses:
GEO. B. BRYANT,
JESSIE F. MURRAY.